United States Patent [19]
Valle

[11] 3,811,786
[45] May 21, 1974

[54] CONNECTING DEVICE
[75] Inventor: Howard C. Valle, Doylestown, Pa.
[73] Assignee: Ametek, Inc., New York, N.Y.
[22] Filed: Jan. 5, 1973
[21] Appl. No.: 321,156

[52] U.S. Cl............ 403/300, 403/306, 403/313, 403/355, 403/DIG. 4
[51] Int. Cl............................................. F16b 2/08
[58] Field of Search........... 403/300, 306, 313, 355, 403/364, 376, 405, DIG. 4; 242/55 A; 267/156

[56] References Cited
UNITED STATES PATENTS
2,943,876 7/1960 Morris .............................. 403/313
3,258,282 6/1966 Koenigshof ...................... 403/306
FOREIGN PATENTS OR APPLICATIONS
265,270 1/1927 Great Britain .................... 403/300

Primary Examiner—Werner H. Schroeder
Attorney, Agent, or Firm—Smith, Harding, Farley & Follmer

[57] ABSTRACT

A pair of cylindrical members substantially equal in diameter have a plurality of pins spaced about the periphery adjacent one edge of each cylindrical member. A spring having a ribbon of spring material with adjacent turns set to coil tightly upon each other and openings adapted to register with the pins on the cylindrical members is back wound around the cylindrical members with the pins passing through the openings in the ribbon. The ribbon is releasably secured in this back wound position. Advantageously the ribbon is releasably secured by means including a pin connecting the ends of the ribbon together.

4 Claims, 6 Drawing Figures

PATENTED MAY 21 1974  3,811,786

CONNECTING DEVICE

BACKGROUND OF THE INVENTION

It is known in the prior art to employ a band to connect two separate members together. However, it does not appear that the prior art has solved the problem of employing such a band to provide for a quick release of the band to disconnect such members. This invention has solved the problem of providing a sure connection between two cylindrical members and a quick release of said connection. It is advantageous in that the quick release is of a type that can be readily controlled from a remote location.

SUMMARY OF THE INVENTION

A connecting device for connecting a pair of cylindrical members has a plurality of pins spaced about the periphery adjacent one edge of each cylindrical member. A spring having a ribbon of spring material with adjacent turns set to coil tightly upon each other and openings adapted to register with the pins on the cylindrical members is back wound around the adjacent edges of the cylindrical members with each pin passing through an opening in the ribbon. The ribbon is releasably secured in the back wound position.

DETAILED DESCRIPTION OF THE INVENTION

Figure 1:
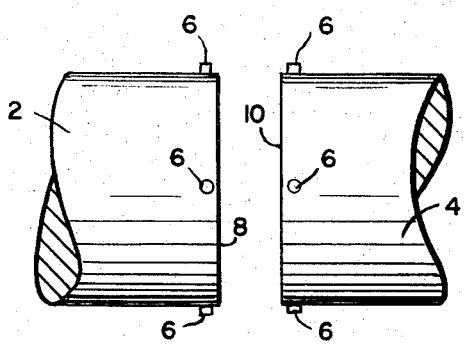
FIG. 1 is a side elevation, partially broken away, showing a pair of cylindrical members having pins in accordance with the invention.

Referring first to FIG. 1, a pair of cylindrical members 2 and 4 having the same diameter have a plurality of pins 6 respectively spaced around the periphery of adjacent ends 8 and 10 of members 2 and 4.

Figure 3:
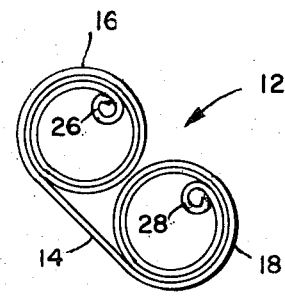
FIG. 3 is a front elevation of the spring ribbon shown in FIG. 2 in the coiled condition.
Figure 2:
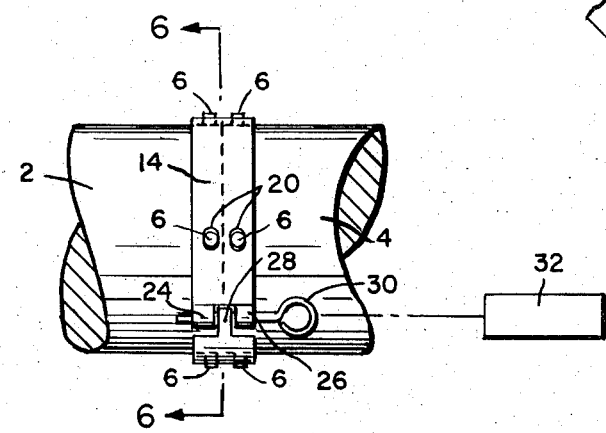
FIG. 2 is a side elevation of the cylindrical members of FIG. 1 connected together by a spring ribbon in accordance with the invention.
Figure 4:
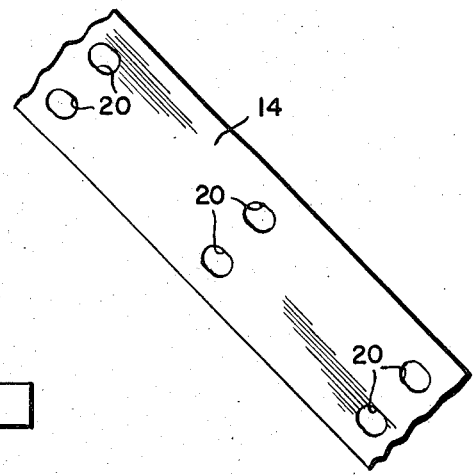
FIG. 4 is a development view, partially broken away, of the spring ribbon of FIG. 3.
Figure 5:
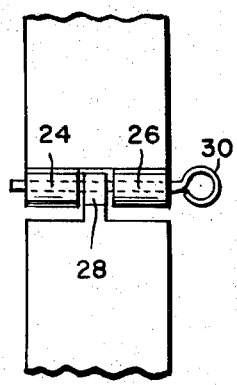
FIG. 5 is an enlarged view, partially broken away, of the structure shown in FIG. 2.

Referring now to FIG. 3, a spring 12 has a ribbon 14 of spring material with adjacent turns set to coil tightly upon each other into two coils 16 and 18 as taught in U. S. Pat. No. 2,609,192 which is incorporated herein by reference. Ribbon 14 has openings 20 (FIG. 4) which are adapted to register with the pin 6 on cylindrical members 2 and 4 (FIG. 2). One end of spring 12 is set into spaced pin receiving coils 24 and 26. The other end is set into a single pin receiving coil 28 which is adapted to be received between coils 24 and 26. A pin member 30 shown in FIG. 3 is adapted to be received within coils 24, 26 and 28 which are aligned eyes.

After ends 8 and 10 of cylindrical members 2 and 4 are brought together with their respective pins 6 opposite each other, ribbon 14 of spring 12 is back wound onto the cylindrical members with the openings 20 engaging pin 6 until coil 28 is positioned between coils 24 and 26. Pin 30 is then inserted through coils 24, 26 and 28 to secure the spring 12 in the back wound position. As thus installed, spring 12 securely connects cylindrical members 2 and 4.

Figure 6:
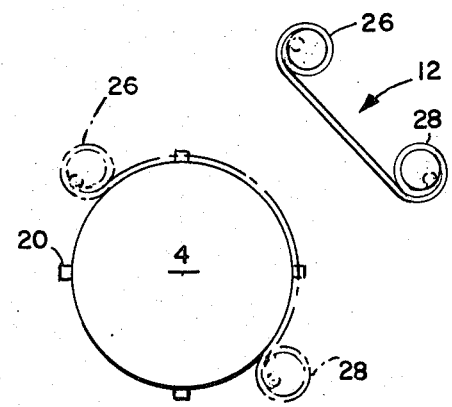
FIG. 6 is a vertical section taken on the plane indicated by the line 6—6 in FIG. 2 showing the spring ribbon after it has been released and coiled to free itself from the pins and disconnect the cylindrical members.

When it is desired to disconnect cylindrical members 2 and 4, pin member 30 is pulled out of coils 24, 26 and 28 releasing spring 12 to coil. Ribbon 14 immediately commences to coil up into coil 16 and 18 withdrawing ribbon 14 from pins 6 until the ribbon reaches the condition clear of all pins shown in FIG. 6 at which time disconnection is complete. Ribbon 14 continues to coil up until it reaches the condition shown in FIG. 3.

As indicated in FIG. 2, pin member 30 may be pulled to effect disconnection remotely through the use of a solenoid indicated schematically at 32.

It will be understood that the above described embodiment is illustrative and is not intended to be limiting.

I claim:

1. In combination with a pair of cylindrical members substantially equal in diameter, the improvement comprising a connecting device comprising:

a plurality of pins spaced about the periphery adjacent one edge of each cylindrical member, a spring having a ribbon of spring material with adjacent turns set to coil tightly upon each other and openings adapted to register with said pins, said spring being back wound around the adjacent edges of the cylindrical members with each said pin passing through an opening in the ribbon, and means to releasably secure said spring in said back wound position, said spring on being released coiling to disengage the pins from the openings and disconnect the pair of cylindrical members.

2. The improvement of claim 1 in which the ends of the ribbon are releasably connected together.

3. The improvement of claim 1 in which eyes in the ends of the ribbon are releasably engaged by a pin.

4. The improvement of claim 1 in which each pin in one member is opposite a pin in the other member.

* * * * *